United States Patent [19]

Fujimori et al.

[11] 4,308,173

[45] Dec. 29, 1981

[54] CATALYST FOR CRACKING HEAVY HYDROCARBONS

[75] Inventors: Kuniaki Fujimori, Tokyo; Teruo Suzuka, Kawaguchi; Yukio Inoue, Urawa; Shirou Aizawa, Toda, all of Japan

[73] Assignee: Nippon Mining Company, Limited, Tokyo, Japan

[21] Appl. No.: 132,955

[22] Filed: Mar. 24, 1980

[30] Foreign Application Priority Data

Mar. 22, 1979 [JP] Japan .................................. 54/32269

[51] Int. Cl.$^3$ ............................................ B01J 23/74
[52] U.S. Cl. ................................. 252/455 R; 208/119; 208/120; 208/124; 252/457; 252/459; 252/466 J; 252/472; 252/473; 423/658
[58] Field of Search ................. 423/658; 208/119, 124, 208/120; 252/459, 457, 455 R, 463, 466 J, 472, 473

[56] References Cited

U.S. PATENT DOCUMENTS

4,224,140  9/1980  Fujimori et al. .................... 423/658

Primary Examiner—O. R. Vertiz
Assistant Examiner—Wayne A. Langel
Attorney, Agent, or Firm—Sughrue, Mion, Zinn, Macpeak and Seas

[57] ABSTRACT

A catalyst is described for use in a process for oxidizing and/or cracking a heavy hydrocarbon under fluidizing conditions in the presence of the catalyst, including simultaneously or subsequently reducing iron oxides in said catalyst and then reacting the reduced oxidation-state iron with steam to produce hydrogen, said catalyst consisting essentially of from 30 to 60 wt % Fe, 0.1 to 10 wt % Ni, and 10 wt % or less $SiO_2$, and having a specific surface area of from 0.1 to 30 m$^2$/g and an apparent specific gravity of from 2.5 to 4.0.

10 Claims, 7 Drawing Figures

CATALYST FOR CRACKING HEAVY HYDROCARBONS

BACKGROUND OF THE INVENTION

1. Field of the Invention

This invention relates to a catalyst for cracking heavy hydrocarbons to make a light oil, i.e., light gas and cracked oil, and also for producing hydrogen by the reaction between the catalyst and steam utilizing an oxidation-reduction reaction.

2. Description of the Prior Art

As a catalyst for cracking heavy hydrocarbons such as atmospheric residual oil, vacuum residual oil, solvent-deasphalting residue, etc., it has been heretofore proposed to use nickel-containing ore calcined at 900° to 1,200° C. (see Japanese Patent Application (OPI) No. 72388/77 (the term "OPI" as used herein refers to a "published unexamined Japanese patent application") and U.S. Pat. No. 4,115,324).

Also, the inventors of the present invention previously invented a process which comprises catalytically cracking a heavy oil (e.g., atmospheric residual oil, vacuum residual oil, etc.) in the presence of a nickel ore, by which heavy metals contained in the heavy oil are removed and the heavy oil is cracked. See Japanese Patent Application (OPI) No. 10202/74.

As a result of further investigations, the inventors have found that if the above-described heavy hydrocarbon is subjected to catalytic cracking in the presence of laterite or a laterite-containing catalyst, coke is formed on the laterite catalyst in a greater amount as the heavy hydrocarbon is cracked to a light oil, although the yield of cracked distillate oil is slightly decreased when compared to the use of the above-described nickel ore. When the laterite catalyst on which the coke is deposited is heated in a gas stream, the iron oxides in the laterite catalyst are very rapidly reduced and hydrogen is easily formed by the steam-iron reaction. Thus, the inventors proposed a process for producing a cracked distillate and hydrogen from a heavy oil which comprises cracking the heavy oil in the presence of laterite or a laterite-containing catalyst while simultaneously depositing coke on the laterite or laterite-containing catalyst, reducing the laterite or laterite-containing catalysts on which the coke is deposited while simultaneously burning the coke in a reducing atmosphere, and forming a hydrogen-rich gas by contacting the reduced laterite or laterite-containing catalyst with steam. See Japanese Patent Application (OPI) No. 47708/79, Japanese Patent Application No. 9413/79 and U.S. Pat. Ser. No. 22,385, filed Mar. 21, 1979.

SUMMARY OF THE INVENTION

As a result of the further investigations on the catalyst for use in the above-described process, the inventors have discovered that:

(i) Laterite catalyst which contains a high content of SiO$_2$ suffers serious deterioration of catalytic activity when used for a long period of time;

(ii) Among the catalysts prepared from laterite, only those with specific physical properties can be stably used for a long period of time; and (iii) Catalyst other than laterite can exhibit similar effects as long as they have specific composition and physical properties.

Therefore, an object of the present invention is to provide a catalyst suitable for stably conducting, for a long period of time, a process for cracking and/or oxidizing a heavy hydrocarbon and also for producing hydrogen from steam.

DETAILED DESCRIPTION OF THE INVENTION

As described above, an object of the present invention is to provide a catalyst suitable for cracking a heavy hydrocarbon and also for producing hydrogen by the reaction between the catalyst and steam.

A catalyst according to the present invention comprises 30 to 60 wt% Fe, 0.1 to 10 wt% Ni and 10 wt% or less SiO$_2$, and has a specific surface area of 0.1 to 30 m$^2$/g and an apparent specific gravity of 2.5 to 4.0.

The catalyst according to the present invention will be explained in terms of its chemical state, particularly that of the Fe, at different times during the process.

When the Fe-containing catalyst is used in a process as described herein, at different times during the process, the iron will be converted into various oxidation states, i.e., metallic iron, iron oxides (FeO, Fe$_3$O$_4$ and Fe$_2$O$_3$), and iron sulfide.

The term "reduced oxidation-state iron" as used herein means metallic iron and iron oxides having a small oxidation number, such as the type of iron oxides referred to as "iron suboxides". The iron suboxides refer to FeO and Fe$_3$O$_4$, both of which have a small oxidation number among the iron oxides, and particularly to a suboxide containing FeO as a main ingredient.

In order to express the degree of reduction of catalyst, a term "reduction rate" (abbreviated as "R") is used. This term is based on the amount of oxygen chemically combined with the iron, and when all of the iron in the catalyst is converted to Fe$_2$O$_3$ (that is, where the Fe has the highest possible oxidation number among the iron oxides), this is defined as 0%. In other words, the reduction rate R is given by the following equation:

$$\text{Reduction Rate (\%)} = \left[ 1 - \frac{\text{gram-atoms of O}_2 \text{ which Fe in the catalyst possesses}}{3/2 \times (\text{gram-atoms of Fe in the catalyst})} \right] \times 100$$

Therefore, when all of the iron in the catalyst is present in the state of metallic Fe, the reduction rate is 100%, and when all of the iron is present in the state of FeO, then the reduction rate becomes 66.7%. Further, if the iron is all present in an Fe$_3$O$_4$ state, the reduction rate is 11.1%.

In the event that the catalyst according to the present invention is used in the cracking of a heavy hydrocarbon and in a process for the generation of hydrogen, the state of iron changes every reaction section. In addition, iron is not present in a single state, and thus the reduced oxidation-state iron may have a reduction rate of, for example 60% or 30%. I.e., the reduction rate varies depending upon the ratio of Fe, FeO and $Fe_3O_4$ in the catalyst.

Several embodiments of the above-described process are as follows:

Process (1)

Figure 1:
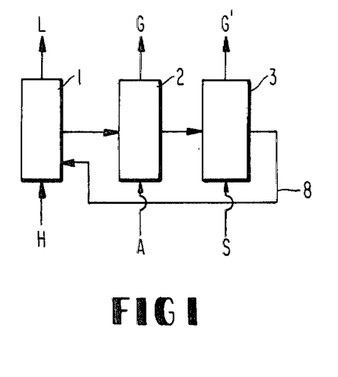
FIGS. 1, 2 and 3 are flow sheets showing embodiments of processes to which the catalyst of the present invention can be applied.

Referring to FIG. 1, a heavy hydrocarbon (H) is cracked in the cracking tower (1) to produce light oils (L) such as light gas and cracked oil, and also coke. Coke deposited on the catalyst is transferred into the regeneration tower (2) and partially combusted by feeding oxygen-containing gas (A), such as air, in an amount not enough for complete combustion of the coke. At the same time, iron component in the catalyst is reduced by the gas containing carbon monoxide and hydrogen and/or by coke in the tower. The reduced oxidation-state iron is then charged into the gasification tower (3) and reacts with steam (S) to produce hydrogen (G'). When cracking high-sulfur heavy hydrocarbons, sulfur compounds in the heavy hydrocarbons are concentrated and deposited on the catalyst together with coke in the cracking tower (1). Then, the sulfur compounds on the catalyst react with the reduced oxidation-state iron in the regeneration tower (2) to form iron sulfide. Thus the sulfur content in the light oils is drastically reduced because of its depositing on the catalyst.

In this situation, the presence of CaO in the catalyst accelerates the sulfur-capturing effect, due to formation of calcium sulfide. Furthermore, in the gasification tower (3) the catalyst-captured sulfur, i.e., iron sulfide and calcium sulfide, reacts with steam (S) and the sulfur is released from the catalyst and converted to hydrogen sulfide, whereas the catalyst is regenerated in an oxidized state. In this situation, introduction of carbon dioxide gas together with steam into the gasification tower (3) further accelerates the catalyst-regenerating effects. The regenerated catalyst is returned into the cracking tower (1) through the line (8).

Process (2)

Figure 2:
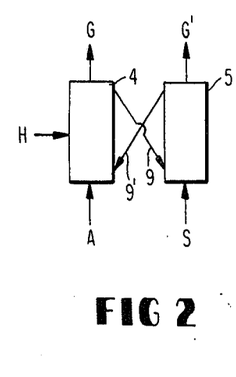

FIG. 2 shows a two tower system, one being the regeneration tower (4) and another being the gasification tower (5). Partial combustion of heavy hydrocarbon, reduction reaction of the catalyst with carbon monoxide gas and/or coke and also heating up of the catalyst are occurred in the regeneration tower (4), and steam-iron reaction to produce hydrogen and oxidation reaction of the catalyst with steam are occurred in the gasification tower (5). This process will be explained in more detail below.

A heavy hydrocarbon (H) is combusted in the fluidized state supplying an oxygen-containing gas (A) (e.g., air) in an amount less than the theoretically required oxygen for complete combustion and, at the same time, the iron component in the catalyst is reduced by the gas (G) containing CO and $H_2$, and/or by coke in the regeneration tower (4). Subsequently, the reduced oxidation-state iron in the catalyst reacts with steam (S) to produce hydrogen (G') and, at the same time, the reduced oxidation-state iron in the catalyst is oxidized by steam in the gasification tower (5). The heat produced in the regeneration tower (4) can be used for steam generation and the like. The catalyst is circulated from the top of the regeneration tower (4) to the bottom of the gasification tower (5) via conduit (9), then moves up through the tower (5) and returns to the regeneration tower (4) via conduit (9').

Process (3)

Figure 3:
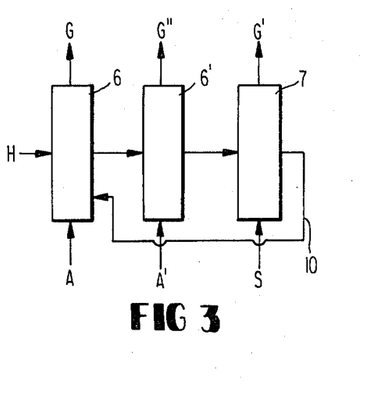

FIG. 3 shows a process which employs three towers, the first regeneration tower (6), the second regeneration tower (6') and the gasification tower (7).

A heavy hydrocarbon (H) is combusted incompletely, a gas containing carbon monoxide, hydrogen, etc., being produced, and also coke is formed in the first regeneration tower (6). Coke on the catalyst is combusted completely in the second regeneration tower (6'), and hydrogen gas is produced by the steam-iron reaction in the gasification tower (7). This process will be explained in more detail below.

A heavy hydrocarbon is combusted in the fluidized state by supplying an oxygen-containing gas (A) in an amount less than the theoretically required oxygen for complete combustion. At the same time, iron oxides in the catalyst are reduced by the gas containing CO and $H_2$ and/or by coke and the gas is withdrawn from the tower top (G). Coke deposited on the catalyst is removed by subjecting it to combustion under a reducing atmosphere produced by feeding an oxygen-containing gas (A') into the second regeneration tower (6') while withdrawing a gas (G") containing CO, $CO_2$, $H_2$, etc., from the tower top, and hydrogen (G') is produced by the reaction between the reduced oxidation-state iron and steam (S) in gasification tower (7).

Additionally, as in process (1), when processing a high-sulfur heavy hydrocarbon according to the process (2) or (3), the sulfur compound reacts with reduced oxidation-state iron in the catalyst to form iron sulfide in the regeneration towers (4), (6) and (6'). The catalyst including the captured sulfur compound in turn reacts with steam (S) in the gasification towers (7) and (5) to release the sulfur compound in the catalyst as hydrogen sulfide and, at the same time, the catalyst is thus regenerated in an oxidized state.

Examples of heavy hydrocarbons that can be processed according to the above-described processes (1), (2) and (3) include residual oils, e.g., atmospheric residual oil, vacuum residual oil and a solvent-deasphalting residue obtained from crude oil, tar sand, oil shale, liquefied coal oil, etc., and solid state hydrocarbons such as coal, asphaltene and resins are also useful.

In the processes with which the present invention is concerned:

(i) all of the reactions are conducted in a fluidizing state;

(ii) the reaction may be carried out at atmospheric pressure or elevated pressure, which is selected according to the condition of the generated hydrogen used, and in general, it is performed at a pressure of 0 to 15 $kg/cm^2G$; and (iii) a reaction temperature between 450° and 950° C. is used, with the temperature of the reaction between the reduced oxidation-state iron and steam, so-called steam-iron reaction, being suitably conducted at about 600° to 850° C.

The steam-iron reaction proceeds faster as the degree of reduction of the iron component is greater. The degree of reduction in the above-described processes (1), (2) and (3) varies depending upon the reaction temperature and the catalyst residence time but, usually, the iron component with a reduction rate of about 25 to 45% provides an extremely fast oxidation reaction, and no differences are observed at 700° to 800° C., though the oxidation reaction becomes slightly slower at 600° C. or less. In the above-described processes, most coke deposited on the catalyst to be used for the steam-iron reaction is removed before being introduced into the gasification tower. However, a slight amount of coke is still deposited on the catalyst and, when the reaction temperature of the steam-iron reaction exceeds 850° C., a water gas reaction takes place to such an extent that the amounts of CO and $CO_2$ in the $H_2$ produced increases so as to complicate a subsequent hydrogen-purifying step.

As is described above, the processes with which the invention is concerned involve the following six reactions:

(1) the reaction of cracking a heavy hydrocarbon;
(2) the partial combustion of the heavy hydrocarbon and/or coke;
(3) the reaction of reducing iron oxides;
(4) the reaction between reduced oxidiation-state iron and sulfur;
(5) the reaction between the reduced oxidation-state iron and steam; and
(6) the reaction between iron sulfide and steam.

These reactions require catalysts which are capable of stably carrying out these reactions for a long period of time. In addition, the agglomeration of catalyst particles to each other, the so-called bogging phenomenon, and the strength of the catalyst, i.e., the attrition resistance, must also be taken into consideration. That is, FeO, a type of reduced oxidation-state iron, causes sintering at 760° to 850° C. This sintering reduces the surface area of the catalyst, which decreases the steam-iron reaction. Furthermore, the catalyst particles are caused to adhere or agglomerate to each other to form large masses; when this occurs fluidization of the catalyst is inhibited and it is difficult to transfer the catalyst particles from one tower to another. Thus, continuous operation of the process becomes impossible. Therefore, it is very important to select the catalyst in which these phenomena do not occur. Fe must be properly dispersed in the catalyst using a refractory material such as $Al_2O_3$, MgO, $SiO_2$, etc., which serves to increase the surface area and enhance the catalyst activity.

Another problem is that when cracking or partially combusting a heavy hydrocarbon, coking often takes place within, or at the outlet of, the cracking and/or regeneration towers. Utilization of heat energy to heat low temperature parts or kinetic energy to scrape off coke from the catalyst particles is effective for decoking. Such a method can be effective for scraping the coke deposited at the outlet of a reaction tower by the catalyst particles blown up to the outlet. These methods necessitate the use of a catalyst with definite strength and density properties.

The catalyst of the present invention consisting essentially of from 30 to 60 wt% iron (as Fe), 0.1 to 10 wt% Ni, and 10 wt% or less $SiO_2$, and having a specific surface area of from 0.1 to 30 $m^2/g$ and an apparent specific gravity of from 2.5 to 4.0 satisfies the above-described requirements. The catalyst preferably also comprises a refractory oxide such as CaO, $Al_2O_3$, MgO, etc. The reason for limiting the iron content in the above-described composition of the catalyst to from 30 to 60 wt% is that: (i) if the content is less than 30 wt%, the amount of $H_2$ to be produced in the gasification tower by the steam-iron reaction decreases, and the proportion of a water gas reaction between coke and steam increases, thus the $H_2$ concentration in the gas being decreased; in addition, the sulfur-capturing ratio in the regeneration tower decreases; and (ii) if the content exceeds 60 wt%, bogging is likely to occur.

Ni promotes the aforesaid reaction (1) of cracking a heavy hydrocarbon, and has the effect of depositing coke, necessary in the iron oxides-reducing step, on the catalyst, i.e., it has the effect of raising the yield of coke. In addition, Ni has the effect of accelerating the foregoing iron sulfide-decomposing reaction (6) between iron sulfide and steam. For these purposes, Ni must be incorporated in a content of at least 0.1 wt% but, if the content exceeds 10 wt%, there results nickel ferrite which increases sintering of iron and therefore inhibits the foregoing reaction (5). Thus, Ni must be incorporated within the range of from 0.1 to 10 wt.%.

Furthermore, $SiO_2$ also contributes to the cracking of a heavy hydrocarbon to some extent, but it primarily functions as an iron-dispersing agent to prevent bogging of the catalyst. However, $SiO_2$ has also been found to influence the aforesaid reaction (5) in the long-term use of the catalyst. Possibly the $SiO_2$ forms some complex salt with reduced oxidation-state iron thus inhibiting the reaction between steam and iron. Therefore, the $SiO_2$ content should be not more than 10 wt%.

Also, CaO is preferably incorporated in an amount of from 0.01 to 20 wt%. If the content exceeds 20 wt%, there results a decrease in the $H_2$ concentration in the gasification tower (as a result of acceleration of water gas reaction) and a reduction in the strength of the catalyst occurs. On the other hand, since CaO accelerates not only the reduction reaction of the iron oxides but also the capture of sulfur, it is preferably incorporated in a content of 0.01 wt% or more.

Furthermore, in order to improve the ratio of decomposing sulfides, to improve the catalyst strength, to improve the bogging-preventing effect, and to accelerate the cracking of a hydrocarbon, it is also preferable to incorporate other inorganic refractory materials such as $Al_2O_3$ or MgO, generally in an amount of from 5 to 60 wt%, based on the total weight of the composition. If the amount is less than 5 wt%, bogging-prevention seriously deteriorates, while if more than 60 wt%, a decrease in the amount of hydrogen produced in the gasification tower and a reduction in the sulfur-capturing efficiency in the regeneration tower occurs.

Even catalysts having the above-described composition do not show a sufficient activity in the reaction of cracking a heavy hydrocarbon, reaction of reducing the iron oxides, or steam-iron reaction unless they have a specific surface area of more than 0.1 $m^2/g$. That is, in the above-described processes, well balanced progress of the six reactions requires a specific surface area of at least 0.1 $m^2/g$. However, if the surface area exceeds 30 $m^2/g$, attrition loss of the catalyst increases due to too much powdering. Also, it should be noted that the specific surface area decreases in the course of long-term use of the catalyst. For example, a catalyst having initially a specific surface area of 10 $m^2/g$ suffered a reduction in the specific surface area to about 0.5 $m^2/g$ after being used for about 80 hours in the aforesaid process (1) during which time, however, the process worked well.

The specific surface area was measured according to ASTM D3663-1978.

In order to improve the attrition resistance of the catalyst during use in the processes as described and to raise the aforesaid decoking efficiency at the outlet of a reaction tower, the catalyst must have an apparent specific gravity of 2.5 or more. The strength of the catalyst corresponds directly to the apparent specific gravity. However, if the apparent specific gravity is too high, attrition of reactors, piping, etc., would occur. Since the above-described surface area also decreases as the apparent specific gravity increases, the apparent specific gravity must be controlled within a range of between 2.5 and 4.0 with consideration for the balance of these factors. This apparent specific gravity can be simply and relatively accurately determined according to a method of using a mercury porosimeter, placing a 0.5 g sample in a vessel, filling it with mercury, and after bringing the vessel to lower pressure restoring it to atmospheric pressure, and measuring the amount of mercury, from which the apparent specific gravity can be calculated.

In preparing the above-described catalyst, materials containing iron in an extremely high content such as ores containing iron in the form of hydroxide, oxide or carbonate (e.g., laterite, magnetite, siderite, hematite, limonite, etc.), or chemical compositions of iron oxides, hydroxides or carbonates are used, and are properly mixed with other materials such as an NiO powder, alumina, magnesia, silica, calcium hydroxide, etc., nickel ores such as garnierite, etc., dolomite, limestone, etc., to attain the desired composition. The catalyst may also be prepared by mixing compounds of hydroxides, oxides, carbonates, sulfates, nitrates, chlorides, sulfides or the like of Fe, Ni, Al, Mg, Si, Ca, etc., or ores properly containing them to attain the desired composition. In either case, it is important to satisfy the above-described composition ratios.

The above-described composition is pulverized, kneaded, granulated, and calcined to prepare the catalyst having the aforesaid physical properties. The conditions of these procedures for preparing the catalyst depend upon the particular above-described raw materials and the composition of the desired catalyst. When using, for example, natural ores having suffered extreme weathering such as laterite, catalysts with desired specific surface area and apparent specific gravity can be obtained by properly pulverizing, kneading with well controlling water content, granulating, and calcining the ores. However, iron ores having suffered almost no weathering require, in some cases, some pre-treatment such as treatment with an acid or alkali. Differences in the raw material generally influence the specific surface area and the apparent specific gravity of the catalyst thus prepared.

Regarding pulverization, a smaller particle size of the pulverized raw material makes the subsequent kneading proceudre easier. In general, it is impossible to pulverize the particles to a size small enough to influence the specific surface area of the prepared catalyst, but the particle size of raw material after pulerization does influence the apparent specific gravity, or the attrition resistance of the resulting catalyst. That is, catalysts with more uniform attrition resistance can be prepared by using a smaller particle size raw material, which serves to decrease the powdering tendency of the catalyst during the long-term use in the process. In general, the pulverized raw material preferably has a particle size of $10\mu$ or less.

Regarding the kneading conditions, the kind of kneader used and the amount of water added influences the apparent specific gravity. In general, as the water content increases, the apparent specific gravity decreases.

Examples of granulating methods include a spray-granulating, crush-granulating, extrusion-granulating, roll-granulating, compression-granulating, etc. These methods influence the apparent specific gravity of the resulting catalyst. For example, catalyst prepared by the spray-granulating method have a smaller apparent specific gravity than catalysts prepared by the crush-granulating method, and the compression-granulating method provides catalysts with an extremely large apparent specific gravity. Additionally, the catalyst to be used in this process preferably has a mean particle size of from 60 to $600\mu$, and hence granulation must be conducted to obtain this particle size.

The calcining condition considerably affects the specific surface area and the apparent specific gravity of the resulting catalyst. As the calcining temperature and the calcining time are increased, the specific surface area decreases and the apparent specific gravity increases. When the calcining temperature exceeds 1,200° C., the results obtained are undesirable. On the other hand, when the calcining temperature is lower than 900° C., the apparent specific gravity is undesirably low.

Catalysts with the aforesaid given specific surface area and apparent specific gravity can be prepared by variously controlling the above-described conditions in such a manner that the resulting catalyst has a specific surface area of from 0.1 to 30 $m^2/g$ and an apparent specific gravity of from 2.5 to 4.0.

A practical procedure according to the aforesaid process (1) for using the catalyst of the present invention will be described below, particularly for applying the process to a vacuum residual oil. Reference is made to the flow sheet shown in FIG. 4.

Figure 4:
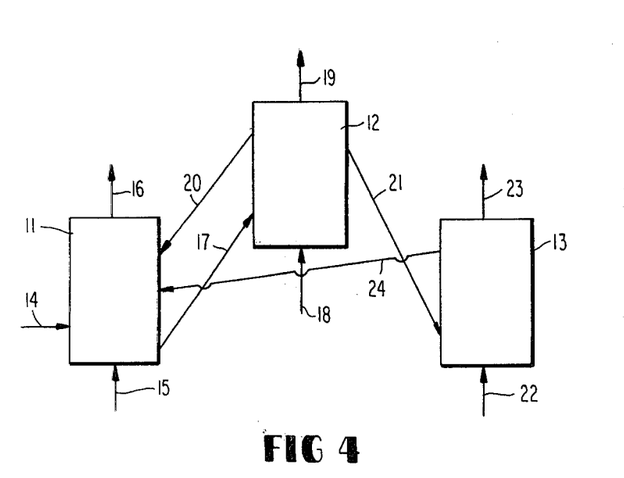
FIGS. 4 and 5 are flow sheets showing the processes employed in Examples of the present invention.

In FIG. 4, the oil is introduced via conduit (14) into a fluidized bed held at 450° to 600° C. under a pressure of 0 to 15 $kg/cm^2G$ (gauge pressure) at the lower part of the cracking tower (11). In the fluidized bed, the granular catalyst is fluidized by a fluidizing gas introduced through the conduit (15). Steam is usually used as the fluidizing gas, although a hydrocarbon gas such as a cracked light gas may also be used. In the cracking tower (11), the oil is catalytically cracked by the catalyst to form a light gas, cracked oil and coke. The light gas and the cracked oil are removed and recovered in the gaseous state, together with the fluidizing gas, via the conduit (16). On the other hand, the coke deposits on the catalyst. With the continuation of the above-described catalytic cracking, the amount of coke deposited on the catalyst increases. In the present invention, the amount of deposited coke is preferably controlled within the range of from 2 wt% to 15 wt%, and preferably from 2 to 8 wt%, based on the total weight of catalyst. If the amount of coke deposited is too small, iron oxides in the catalyst are not reduced sufficiently in the subsequent process steps. On the other hand, if the amount of coke deposited on the catalyst is too high, the activity of the catalyst decreases, so that the yield of the cracked oil is lowered, and the coke does not fully solidify on the catalyst, thus leading to the formation of agglomerated particles. Thus, such amounts are not preferable. When processing a high-sulfur oil, the sulfur compounds are concentrated and deposited on the catalyst together with the coke.

The thus coke-laden catalyst is transferred to regeneration tower (12) via conduit (17). The regeneration tower (12) is kept at a temperature of from 750° to 950° C. and a pressure of from 0 to 15 $kg/cm^2G$ (gauge pressure), and the coke deposited on the catalyst is partially combusted with an oxygen-containing gas fed via conduit (18) to provide the quantity of heat necessary for the entire system and to reduce the iron oxides in the catalyst. It is believed that the reduced catalyst is obtained by reduction of the iron oxides in the catalyst according to the following reduction equations (1) to (6).

$$Fe_2O_3 + C \rightarrow Fe_3O_4 + CO + CO_2 \quad (1)$$

$$Fe_3O_4 + C \rightarrow FeO + CO + CO_2 \quad (2)$$

$$FeO + C \rightarrow Fe + CO + CO_2 \quad (3)$$

$$3Fe_2O_3 + CO \rightarrow 2Fe_3O_4 + CO_2 \quad (4)$$

$$Fe_3O_4 + CO \rightarrow 3FeO + CO_2 \quad (5)$$

$$FeO + CO \rightarrow Fe + CO_2 \quad (6)$$

The above reduction reactions are more advantageously carried out as the reaction temperature is increased or as the amount of coke deposited on the catalyst is increased. However, a reduction temperature higher than 950° C. is not economically preferred, because the reactor may be damaged and bogging would occur during the operation. Accordingly, it is preferred to use a temperature of about 750° to 950° C. Furthermore, regarding the amount of coke deposited, as previously described, the reduction is sufficiently carried out when the amount of coke deposited is about 2 to 15 wt%. Furthermore, in the above-described reduction, the entire system is heated by partial combustion of coke according to the following equations (7) and (8):

$$C + O_2 \rightarrow CO_2 \quad (7)$$

$$C + \tfrac{1}{2}O_2 \rightarrow CO \quad (8)$$

Moreover, when sulfur compounds are present in the coke, these sulfur compounds react with the reduced oxidation-state iron to form iron sulfide, whereby the sulfur content in the exhaust gas is drastically reduced. Additionally, the presence of calcium accelerates the capture of sulfur compounds.

The exhaust gas containing $CO_2$ and $CO$ produced by the reactions between iron oxides and coke and between coke and oxygen is discharged via conduit (19). The catalyst particles heated to from 750° to 950° C. are transferred to the cracking tower (11) and the gasification tower (13) via conduits (20) and (21), respectively. The reduced oxidation-state iron-containing catalyst is charged to the gasification tower (13) via transfer conduit (21), where it undergoes oxidation with steam fed via conduit (22) to produce hydrogen. Additionally, the temperature and the pressure within the gasification tower are kept at 600° to 850° C. and 0 to 15 kg/cm²G (gauge pressure), respectively. The reduction between the reduced oxidation-state iron and steam proceeds according to the following quations (9) to (11).

$$Fe + H_2O \rightarrow FeO + H_2 \quad (9)$$

$$3FeO + H_2O \rightarrow Fe_3O_4 + H_2 \quad (10)$$

$$2Fe_3O_4 + H_2O \rightarrow 3Fe_2O_3 + H_2 \quad (11)$$

The above-described reactions are advantageously carried out at lower temperatures based on thermodynamic considerations. However, from the viewpoint of practical operation, it is preferred to use a temperature between the cracking temperature and the catalyst regeneration temperature, such as a temperature between about 600° and 950° C. Also, the sulfur which has been captured by the catalyst in the form of iron sulfide and calcium sulfide reacts with steam. Thus, the catalyst is regenerated to form the oxides and the sulfur compounds are released as hydrogen sulfide. In this situation, introduction of carbon dioxide gas together with the steam accelerates this regeneration effect.

Additionally, in the above-described gasification tower (13), part of the coke on the catalyst reacts with steam to cause water gas reaction according to the following equations (12) and (13), to thereby decrease the hydrogen concentration:

$$C + H_2O \rightarrow CO + H_2 \quad (12)$$

$$C + 2H_2O \rightarrow CO_2 + 2H_2 \quad (13)$$

However, by decreasing the amount of the coke on the catalyst as much as possible, or by lowering the reaction temperature as far as possible, these reactions can be suppressed.

Thus, since the oxidation reactions of reduced oxidation-state iron shown in equations (9) to (11) chiefly occur in the gasification tower (13), the hydrogen concentration in the gas discharged from conduit (23) of the gasification tower (13) is very high, gradually 80 wt% by volume or more in the dry state. The thus oxidized catalyst is circulated back to the cracking tower (11) via conduit (24).

As will be understood from the above description, use of the catalyst of the present invention is advantageous in that a heavy hydrocarbon can be catalytically cracked using a catalyst capable of being prepared in a simple manner to produce a cracked oil such as cracked light gas and cracked oil, and also hydrogen with industrial advantages.

Furthermore, it has the merit of advantageously producing hydrogen in an industrial process by the partial combustion of a heavy hydrocarbon.

The present invention will now be described in more detail by reference to the following examples, for purposes of illustrating, but not limiting the scope of this invention.

EXAMPLE 1

$Fe_2O_3$, $NiO$, $Al_2O_3$, $SiO_2$, $MgO$, and $Ca(OH)_2$ were mixed as raw materials and pulverized to obtain a particle size of $10\mu$ or less. Then, water was added thereto and the mixture was kneaded for 15 minutes before crushing and granulation. The granulated product was calcined at 1,200° C. for 3 hours to obtain catalysts with different compositions having a mean particle size of 0.2 mm as shown in Table 1. The specific surface area and the apparent specific gravity of these catalysts were 1.6 to 2.0 m²/g and 3.5 to 3.8, respectively. These catalysts were partially sulfided with $H_2S$ at 850° C. to prepare catalysts containing about 0.8 wt% sulfur.

Figure 5:
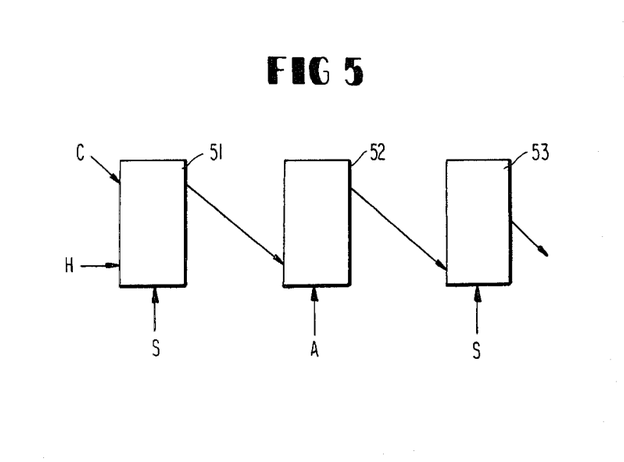

Each of the above-described catalysts was used for the process as illustrated in appended FIG. 5, and the procedure of heavy oil cracking (51), regeneration (52) and gasification (53) were conducted in a single-pass manner. Dimensions of the equipment used and the properties of the oil were as follows.

|  | Diameter (cm) | Height (m) |
|---|---|---|
| Cracking tower (51) | 12.7 | 1.6 |
| Regeneration tower (52) | 15.1 | 1.8 |
| Gasification tower (53) | 10.2 | 1.9 |

| Properties of Heavy Oil (Kuwait vacuum residual oil | |
|---|---|
| Specific gravity (15/4° C.) | 1.0497 |
| Residual carbon | 17.5 wt% |
| Sulfur | 4.96 wt% |

The composition of the catalysts used in each run is shown in Table 1.

The catalyst was fed to the cracking tower at a rate of 16 kg/hr.

TABLE 1

| Run No. | A | B | C | D | E | F | G |
|---|---|---|---|---|---|---|---|
| Catalyst Composition | | | | | | | |
| Fe (wt%) | 49.7 | 40.9 | 53.2 | 30.6 | 58.9 | 34.1 | 48.6 |
| Ni (wt%) | 1.4 | 1.2 | 1.2 | 1.3 | 0.9 | 0.2 | 9.5 |
| CaO (wt%) | 0.1 | 19.2 | 17.6 | 18.7 | 1.0 | 0.5 | 0.8 |
| $Al_2O_3$ + MgO + $SiO_2$ (wt%) | 27.4 | 21.0 | 5.1 | 49.4 | 13.6 | 47.7 | 20.0 |

Results of the operation in the cracking tower (51), regeneration tower (52), and gasification tower (53) are shown in the following Tables 2, 3 and 4, respectively.

(i) Cracking Tower

TABLE 2

| Run No. | A | B | C | D | E | F | G |
|---|---|---|---|---|---|---|---|
| Cracking temperature (°C.) | | | | 540 | | | |
| Heavy oil-feeding rate (kg/h) | 3.1 | 3.0 | 2.8 | 3.0 | 3.0 | 3.1 | 2.7 |
| Coke deposited on the catalyst (wt%) | 3.7 | 3.5 | 3.7 | 3.4 | 3.5 | 3.1 | 4.2 |
| Sulfur deposited on the catalyst (wt %) | 1.1 | 1.0 | 1.1 | 1.0 | 1.0 | 1.0 | 1.2 |
| Yield of cracked light gas (wt. %) | 13.8 | 13.0 | 14.2 | 11.6 | 12.9 | 10.6 | 14.1 |
| Yield of cracked oil (wt %) | 67.1 | 68.3 | 63.8 | 69.6 | 67.8 | 72.9 | 59.9 |

(ii) Regeneration Tower

TABLE 3

| Run No. | A | B | C | D | E | F | G |
|---|---|---|---|---|---|---|---|
| Regeneration temperature (°C.) | | | | 850 | | | |
| Amount of introduced air (Nm³/h) | 1.58 | 1.49 | 1.64 | 1.50 | 1.55 | 1.37 | 1.87 |
| Reduction rate (%) of the catalyst (at outlet) | 26.1 | 29.6 | 26.5 | 20.8 | 24.0 | 28.1 | 22.3 |
| Sulfur-capturing ratio* (%) | 97.2 | 95.3 | 99.8 | 94.6 | 99.1 | 86.1 | 90.5 |

*The rate of sulfur on the catalyst coming out of the tower vs sulfur on the catalyst charged into the tower.

(iii) Gasification Tower

TABLE 4

| Run No. | A | B | C | D | E | F | G |
|---|---|---|---|---|---|---|---|
| Gasification temperature (°C.) | | | | 750 | | | |
| Steam feed (kg/h) | 1.8 | 1.7 | 1.7 | 1.5 | 1.6 | 1.6 | 1.9 |
| Amount of produced gas (Nl/h) | 595 | 654 | 696 | 575 | 631 | 546 | 561 |
| Hydrogen concentration (vol%) | 97.2 | 89.1 | 90.6 | 80.7 | 92.7 | 81.8 | 83.7 |
| Sulfide-decomposing ratio**(%) | 12.1 | 21.8 | 18.7 | 22.6 | 11.5 | 12.0 | 19.4 |

**: $\frac{S_1 - S_2}{S_1} \times 100$ $S_1$: sulfur on the catalyst charged into the tower
$S_2$: sulfur on the catalyst coming out of the tower As is shown above, catalysts containing from 30 to 60 wt% Fe and from 0.1 to 10 wt% Ni are found to be useful in the described process, and it is seen that as the more the Ni content increases, the coke-deposition ratio upon cracking a heavy oil also increases, which is advantageous in the subsequent reduction step.

COMPARATIVE EXAMPLES 1 and 2

Results obtained by the same procedures as in Example 1 except for using a catalyst containing 13.5 wt% Fe, 2.8 wt% Ni, 0.8 wt% CaO, and 82.9 wt% ($Al_2O_3$+MgO+$SiO_2$) are tabulated in Table 5 as Comparative Example 1.

Separately, a catalyst was prepared in the same manner as in Example 1 using laterite ore, with clacining at 1,250° C. for 10 hours. The resulting catalyst contained 55.4 wt% Fe, 1.4 wt% Ni, and 8.4 wt% ($Al_2O_3$+MgO+$SiO_2$), and had a specific surface area of 0.07 m²/g. Results obtained by the same procedure as described above using this catalyst are also shown in Table 5 as Comparative Example 2.

TABLE 5

| | Item | Comp. Ex. 1 | Comp. Ex. 2 |
|---|---|---|---|
| Cracking tower | Heavy oil-feeding rate (kg/h) | 3.0 | 3.2 |
| | Coke deposited on the catalyst (wt %) | 3.8 | 2.8 |
| | Sulfur deposited on the catalyst (wt %) | 1.1 | 1.0 |
| | Cracked light gas yield (wt%) | 13.7 | 12.3 |
| | Cracked oil yield (wt%) | 65.3 | 73.3 |
| Regeneration tower | Amount of introduced air (Nm³h) | 1.68 | 1.22 |
| | Reduction rate of the catalyst (at outlet) (%) | 16.7 | 18.2 |
| | Sulfur-capturing ratio (%) | 70.1 | 90.3 |
| Gasification tower | Steam feed (kg/h) | 1.7 | 1.6 |
| | Amount of produced gas (Nm³/h) | 417 | 460 |
| | Hydrogen concentration (vol %) | 69.2 | 82.4 |
| | Sulfide-decomposing ratio (%) | 18.5 | 13.4 |

As is seen from the above results, the gas in the gasification tower was produced in a small amount in the comparative examples, and in Comparative Example 1, the hydrogen concentration was relatively low.

EXAMPLES 2 TO 6 AND COMPARATIVE EXAMPLE 3

Laterite ores containing 55.2 wt% Fe, 1.35 wt% Ni, 1.1 wt% MgO, 3.44 wt% $SiO_2$, and 4.01 wt% $Al_2O_3$ were pulverized to a particle size of 10μ or less, water was added thereto, and the mixture was kneaded, crushed, and granulated to prepare the samples of Examples 2 to 5 and Comparative Example 3.

Calcining temperature and time were changed among the Examples 2 to 5 and Comparative Example 3 as shown in Table 6. The particle size of all catalysts was conditioned to be in the range of from 149μ to 250μ with use of the sieves. A particle size of the catalysts was in the range of from 190 to 200μ.

In addition to these samples, a laterite ore containing 43.6 wt% Fe, 2.1 wt% Ni, 9.1 wt% MgO, 11.2 wt% $SiO_2$ and 4.6 wt% $Al_2O_3$ was similarly processed to prepare the sample of Example 6. The results obtained are also shown in Table 6.

COMPARATIVE EXAMPLE 4

The same laterite ores as used in Examples 2 to 5 were similarly pulverized, kneaded, and granulated using a spray granulator. The resulting granules were calcined at 1,200° C. for 3 hours to prepare a catalyst having a particle size of 149 to 250μ.

Fluid attrition resistance was measured in a manner described below using an apparatus shown in FIG. 6.

Figure 6:
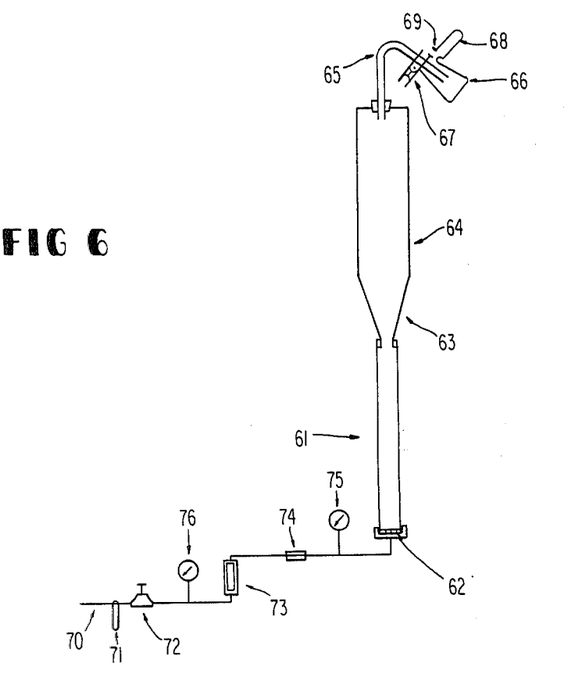
FIG. 6 shows a measuring apparatus for measuring the fluid attrition resistance.

The apparatus shown in FIG. 6 is composed of catalyst tube (61) having an inside diameter of 1½ inches and a height of 27½ inches, at the bottom portion of which perforated plate (62) having four pores, (0.015 inch in diameter) is provided, and connected to the upper portion thereof, upper tube (64), having an inside diameter of 5 inches, a height of 18 inches, and a converging portion (63) with a height of 4 inches, is provided, respectively. The upper portion of upper tube (64) is connected to a flask (66) via glass tube (65) and pinch lamp (67). Flask (66) is further connected to extraction thimble (68) via hose clamp (69). The bottom end of catalyst tube (61) is connected to air line (70), which is equipped with an air filter (71), a pressure regulator (72), a rotameter (73), a flow controller (74), and pressure gauges (75) and (76).

5 g of water was added to a 45 g dry catalyst, and the resulting mixture was charged in a catalyst tube. Then, air was introduced so that the superficial velocity in the catalyst tube became 94 cm/sec., and the dust trapped in the extraction thimble after 5, 10 and 45 hours was weighed. The powdering ratio for each time period was calculated, and the resulting ratios were plotted versus time to determine the time for a powdering ratio of 1%.

The results of fluid attrition resistance test of Examples 2 to 6 and Comparative Examples 3 and 4 are shown in Table 6.

TABLE 6

| | Calcining Temperature (°C.) | Calcining Time (hrs) | Specific Surface Area (m²/g) | Apparent Specific Gravity | Fluid Attrition Resistance (hrs/%) |
|---|---|---|---|---|---|
| Comparative Example 3 | 1,000 | 3 | 18.3 | 2.31 | 4 |
| Comparative Example 4 | 1,200 | 3 | — | 2.44 | 4 |
| Example 2 | 1,100 | 3 | 7.9 | 2.73 | 7.5 |
| Example 3 | 1,150 | 3 | 3.2 | 3.28 | 11.5 |
| Example 4 | 1,200 | 3 | 1.7 | 3.69 | 15 |
| Example 5 | 1,200 | 10 | 0.7 | 3.96 | 21 |
| Example 6 | 1,200 | 3 | 0.3 | 3.45 | 12 |

Figure 7:
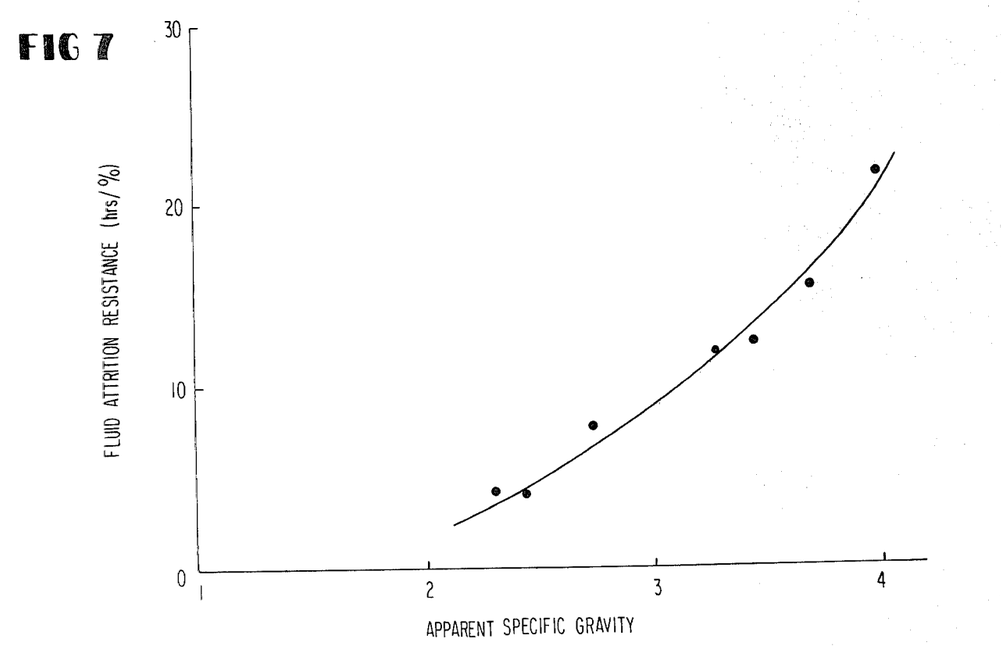
FIG. 7 is a graph showing the relationship between the apparent specific gravity and the fluid attrition resistance.

As is seen from the above results, there are no definite relationship between the apparent specific gravity and the specific surface area due to the influence of the composition. However, the apparent specific gravity and the powdering ratio of the catalyst or the fluid attrition resistance used as a measure for indicating strength of the catalyst are in the relation as shown in FIG. 7. It is seen from FIG. 7 that, the smaller the apparent specific gravity, the more the powdering occurs.

EXAMPLE 7 AND COMPARATIVE EXAMPLE 5

Using the three-towered circulate-fluidizing type equipment shown in FIG. 4, a heavy oil was cracked producing hydrogen. The reactors were made of stainless steel. The cracking tower had a diameter of 5 inches and a height of 1.6 m, the regeneration tower had a diameter of 6 inches and a height of 1.8 m, and the gasification tower had a diameter of 4 inches and a height of 1.9 m, with a cyclone being provided at the outlet of each tower. The yeavy oil used was the same as in Example 1. A laterite ore was pulverized, kneaded, granulated, dried, and calcined at 1,160° C. for 3 hours to prepare catalyst particles having a particle size in the range of from 70 to 400μ. The composition of the calcined catalyst was: Fe: 49.7 wt%; Ni: 1.44 wt%; $Al_2O_3$: 2.85 wt%; MgO: 5.54 wt%; $SiO_2$: 1.81 wt%; CaO: 0.04 wt%.

Results after 100 hour operation are shown in Table 7 as Example 7.

Also, the same operation was conducted using a catalyst prepared in the same manner as in Example 7 and containing 37.7 wt% Fe, 2.0 wt% Ni, 1.3 wt% $Al_2O_3$, 19.6 wt% MgO, and 12.6 wt% $SiO_2$. Results thus obtained are also shown in Table 7 as Comparative Example 5.

Additionally, operating conditions employed are as follows:

Operating Conditions:
　Pressure, 0–1 kg/cm²G (gauge pressure)
　Cracking tower: reaction temperature, 540° C.; catalyst hold-up, 10 kg; amount of catalyst circulated from cracking tower to regeneration tower, 40 kg/h; heavy oil-feeding rate, 4.3 kg/h; steam-feeding rate, 29 kg/h
　Regeneration tower: reaction temperature, 830° C.; catalyst hold-up, 11 kg; air-feeding rate, 2 m³/h
　Gasification tower: reaction temperature, 750° C.; catalyst hold-up, 12 kg; steam-feeding rate, 1.9 kg/h

TABLE 7

| | Example 7 | Comparative Example 5 | |
|---|---|---|---|
| Measurement Items | 100 hrs after initiation of operation | 5 hrs after initiation of operation | 100 hrs after initiation of operation |
| Cracking tower Yield | | | |
| Cracked light gas (wt %) | 13.1 | 11.3 | 11.0 |
| Cracked oil (wt %) | 70.0 | 72.2 | 73.6 |
| Coke (wt %) | 16.9 | 16.5 | 15.4 |
| Cracked light gas composition | | | |
| $H_2$ (mol %) | 37.4 | 33.0 | 29.5 |
| $CH_4$ (mol %) | 20.3 | 20.2 | 25.3 |
| $H_2S$ (mol %) | 1.5 | 1.8 | 1.4 |
| Regeneration tower Gas composition | | | |

TABLE 7-continued

| Measurement Items | Example 7 100 hrs after initiation of operation | Comparative Example 5 5 hrs after initiation of operation | Comparative Example 5 100 hrs after initiation of operation |
| --- | --- | --- | --- |
| $SO_2$ (ppm) | 30 | 32 | 100 |
| $H_2S$ (ppm) | 150 | 155 | 150 |
| NO (ppm) | tr. | tr. | tr. |
| Gasification tower | | | |
| Amount of produced gas (Nl/kg-feed oil) | 123.5 | 127.3 | 93.8 |
| Gas composition | | | |
| $H_2$ (mol %) | 89.1 | 86.3 | 82.1 |
| $CH_4$ (mol %) | 0.6 | 0.6 | 0.7 |
| CO (mol %) | 0.7 | 0.8 | 1.0 |
| $CO_2$ (mol %) | 1.7 | 3.2 | 2.8 |
| $H_2S$ (mol %) | 7.9 | 8.0 | 7.3 |

As is seen from the above results, when $SiO_2$ is included in a large amount, a decrease in the amount of hydrogen produced in the gasification tower occurred during long-term use of the catalyst.

While the invention has been described in detail and with reference to specific embodiments thereof, it will be apparent to one skilled in the art that various changes and modifications can be made therein without departing from the spirit and scope thereof.

What is claimed is:

1. A catalyst for use in a process for oxidizing and/or cracking a heavy hydrocarbon under fluidizing conditions in the presence of the catalyst, including simultaneously or subsequently reducing iron oxides in said catalyst and then reacting the reduced oxidation-state iron with steam to produce hydrogen, said catalyst consisting essentially of from 30 to 60 wt% Fe, 0.1 to 10 wt% Ni, and 10 wt% or less $SiO_2$, and having a specific surface area of from 0.1 to 30 $m^2/g$ and an apparent specific gravity of from 2.5 to 4.0.

2. The catalyst of claim 1, said catalyst having been, prepared by pulverizing, kneading, granulating and calcining a raw material comprising one or more iron compounds or natural iron ores or a mixture of iron compounds and natural iron ores with an inorganic refractory material.

3. The catalyst of claim 2, wherein said inorganic refractory material is $Al_2O_3$, MgO, CaO or a mixture thereof.

4. The catalyst of claim 3, wherein said inorganic refractory material is CaO in an amount from 0.01 to 20 wt% based on the total weight of the catalyst.

5. The catalyst of claim 3, wherein said inorganic refractory material is $Al_2O_3$, MgO or a mixture thereof in an amount from 5 to 60 wt% based on the total weight of the catalyst.

6. The catalyst of claim 2, wherein the pulverized raw material has a particle size of $10\mu$ or less.

7. The catalyst of claim 2, wherein the kneading is carried out by adding water and using a kneader.

8. The catalyst of claim 2, wherein the granulating is carried out by means of a spray-granulating, crush-granulating, extrusion-granulating, roll-granulating, or compression granulating.

9. The catalyst of claim 2, wherein the calcining is carried out at a temperature of 900° C. to 1,200° C.

10. The catalyst of claim 1, wherein the mean particle size is between 60 and 600$\mu$.

* * * * *